US012811443B2

(12) United States Patent
Ji et al.

(10) Patent No.: US 12,811,443 B2
(45) Date of Patent: Nov. 24, 2026

(54) MOTOR WITH A HOUSING COMPRISING EXTENSIONS HAVING STATOR GROOVES, AND A STATOR COMPRISING HOUSING GROOVES IN CONTACT WITH THE STATOR GROOVES

(71) Applicant: LG Electronics Inc., Seoul (KR)

(72) Inventors: Youngjin Ji, Seoul (KR); Honghyun Kim, Seoul (KR); Mingyu Kim, Seoul (KR); Gyujong Jeong, Seoul (KR); Jinsub Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 262 days.

(21) Appl. No.: 18/705,811

(22) PCT Filed: Dec. 16, 2021

(86) PCT No.: PCT/KR2021/019177

§ 371 (c)(1),
(2) Date: Apr. 29, 2024

(87) PCT Pub. No.: WO2023/075017

PCT Pub. Date: May 4, 2023

(65) Prior Publication Data

US 2026/0142507 A1 May 21, 2026

(30) Foreign Application Priority Data

Oct. 29, 2021 (KR) ........................ 10-2021-0147061

(51) Int. Cl.
*H02K 1/14* (2006.01)
*H02K 5/16* (2006.01)

(52) U.S. Cl.
CPC ............. *H02K 1/146* (2013.01); *H02K 5/163* (2013.01)

(58) Field of Classification Search
CPC .......... H02K 1/146; H02K 1/165; H02K 1/16; H02K 1/14; H02K 1/148; H02K 5/163; H02K 15/022
(Continued)

(56) References Cited

U.S. PATENT DOCUMENTS 2,151,561 A * 3/1939 Morrill .................. H02K 1/185 310/216.049
4,512,485 A * 4/1985 Agbay ................... B65D 41/48 220/221
(Continued)

FOREIGN PATENT DOCUMENTS

KR 20-1999-0039148 11/1999
KR 10-2015-0140201 12/2015
(Continued)

OTHER PUBLICATIONS

KR102175796 English Translation.*
Extended European Search Report in European Appln. No. 21962640.5, mailed on Oct. 15, 2025, 8 pages.

*Primary Examiner* — Maged M Almawri
(74) *Attorney, Agent, or Firm* — Fish & Richardson P.C.

(57) ABSTRACT

A motor includes a housing, a bearing disposed in the housing, a rotating shaft rotatably coupled to the bearing, an impeller cover disposed on an upper part of the housing, an impeller disposed inside the impeller cover and coupled to the rotating shaft, a magnet coupled to a lower area of the rotating shaft, a stator coupled to the housing and facing the magnet, and a coil wound around the stator. In this case, the housing may include a stator groove formed radially outward from an inner surface of the housing, and the stator may be press-fitted into the stator groove.

19 Claims, 10 Drawing Sheets

(58) Field of Classification Search
USPC ............ 310/89, 180, 216.086, 433, 216.051, 310/216.069–216.88
See application file for complete search history.

(56) References Cited

U.S. PATENT DOCUMENTS

| | | | | |
|---|---|---|---|---|
| 7,348,706 | B2 * | 3/2008 | Ionel | H02K 1/148 310/216.137 |
| 8,147,216 | B2 * | 4/2012 | Schiffhauer | F04B 53/08 417/371 |
| 10,778,065 | B2 * | 9/2020 | Bang | H02K 1/28 |
| 10,840,773 | B2 * | 11/2020 | Takano | H02K 15/026 |
| 10,985,621 | B2 * | 4/2021 | Yamagata | H02K 21/16 |
| 10,998,797 | B2 * | 5/2021 | Gregorich | H02K 11/0094 |
| 12,149,120 | B2 * | 11/2024 | Jang | H02K 1/148 |
| 2001/0038797 | A1 * | 11/2001 | Makino | H02K 7/14 417/410.3 |
| 2004/0070304 | A1 * | 4/2004 | Enomoto | H02K 1/187 310/216.088 |
| 2004/0113504 | A1 * | 6/2004 | Agnes | H02K 1/17 310/154.08 |
| 2011/0304225 | A1 * | 12/2011 | Terashita | H02K 1/185 310/49.37 |
| 2012/0237373 | A1 * | 9/2012 | Li | H02K 9/06 417/410.1 |
| 2014/0001911 | A1 * | 1/2014 | Tang | H02K 1/2773 310/156.56 |
| 2014/0101926 | A1 | 4/2014 | Kenyon et al. | |
| 2014/0175957 | A1 * | 6/2014 | Tang | H02K 1/2773 310/156.01 |
| 2015/0351599 | A1 | 12/2015 | Park et al. | |
| 2015/0372544 | A1 * | 12/2015 | Iwasaki | H02K 21/24 310/43 |
| 2019/0052147 | A1 * | 2/2019 | Bang | A47L 9/22 |
| 2020/0067370 | A1 * | 2/2020 | Takemoto | H02K 1/14 |
| 2020/0217330 | A1 | 7/2020 | Fujiwara et al. | |
| 2021/0288549 | A1 | 9/2021 | Kim et al. | |
| 2021/0348616 | A1 * | 11/2021 | Hwang | F04D 29/057 |

FOREIGN PATENT DOCUMENTS

| | | | |
|---|---|---|---|
| KR | 10-2018-0028731 | A | 3/2018 |
| KR | 10-2019-0124667 | | 11/2019 |
| KR | 10-2175796 | | 11/2020 |
| WO | 2019/050214 | A1 | 3/2019 |

* cited by examiner

10

MOTOR WITH A HOUSING COMPRISING EXTENSIONS HAVING STATOR GROOVES, AND A STATOR COMPRISING HOUSING GROOVES IN CONTACT WITH THE STATOR GROOVES

CROSS-REFERENCE TO RELATED APPLICATIONS

This application is a National Stage application under 35 U.S.C. § 371 of International Application No. PCT/KR2021/019177, filed on Dec. 16, 2021, which claims the benefit of Korean Patent Application No. 10-2021-0147061, filed on Oct. 29, 2021. The disclosures of the prior applications are incorporated by reference in their entirety.

TECHNICAL FIELD

The present disclosure relates to a motor. More particularly, the present disclosure relates to a vacuum cleaner motor.

BACKGROUND

In general, a vacuum cleaner is a home appliance that suctions foreign substances such as dust and collects them in a separate dust collection unit installed inside a main body.

Specifically, the vacuum cleaner requires high suction power to effectively suction foreign substances, and an intensity of the suction power may be proportional to a rotational force of a motor. That is, as the rotational force of the motor increases, a rotational speed of a fan connected to the motor increases, thereby increasing the suction power of foreign substances.

A conventional vacuum cleaner motor is disclosed in a prior art below.

As disclosed in the prior art, both ends of a rotating shaft of a vacuum cleaner motor are supported by an upper bearing and a lower bearing. A rotor assembly is mounted on the rotating shaft between the upper bearing and the lower bearing.

The lower bearing is mounted in the center of the bottom of a motor housing, and the upper bearing is mounted in the center of a bearing housing. The bearing housing is fixed to an upper surface of the motor housing.

In this instance, as a fastening protrusion protruding downward from an outer edge of the bearing housing is inserted into a fastening hole formed on the upper surface of the motor housing, the bearing housing is fixed to the motor housing. Alternatively, instead of the fastening protrusion, a fastening member such as a screw passes through an edge of the bearing housing and is inserted into the fastening hole of the motor housing, and hence the bearing housing is fixed to the motor housing.

For ease of fastening, a diameter of the fastening hole formed in the motor housing is generally formed to be slightly larger than an outer diameter of the fastening protrusion. That is, there is a certain amount of fastening tolerance in which the diameter of the fastening hole is larger than the outer diameter of the fastening protrusion.

Due to the fastening tolerance, the bearing housing may be misalignedly coupled in a radial direction of the motor housing in a state in which the fastening protrusion is inserted into the fastening hole.

When the bearing housing is misalignedly coupled in the radial direction of the motor housing, a rotation axis of the motor is eccentric by a predetermined angle from a central axis of the motor housing. Due to the eccentricity of the rotation axis of the motor, an air gap between a stator and a mover is not uniform during high-speed rotation.

Due to the non-uniform air gap between the stator and the mover, there was a problem in that vibration and noise were generated, and the efficiency of the motor was reduced.

SUMMARY

An object of the present disclosure is to provide a motor that can reduce the generation of vibration and noise by maintaining a constant air gap between a stator and a mover.

Another object of the present disclosure is to provide a motor that can improve efficiency of the motor.

Another object of the present disclosure is to provide a motor that can minimize deformation and reduce the number of components by fixing a stator and a mover.

To achieve the above-described and other objects, in one aspect of the present disclosure, there is provided a motor comprising a housing, a bearing disposed in the housing, a rotating shaft rotatably coupled to the bearing, an impeller cover disposed on an upper part of the housing, an impeller disposed inside the impeller cover and coupled to the rotating shaft, a magnet coupled to a lower area of the rotating shaft, a stator coupled to the housing and facing the magnet, and a coil wound around the stator. In this case, the housing may include a stator groove formed radially outward from an inner surface of the housing, and the stator may be press-fitted into the stator groove.

Through this, the present disclosure can reduce the generation of vibration and noise by maintaining a constant distance between the magnet, which is a mover, and the stator, which is a stator, and thus can improve the efficiency of the motor.

In addition, the present disclosure can minimize the deformation by fixing the stator to the housing without any additional configuration, and thus can reduce the number of components.

The stator may include a stator core press-fitted into the stator groove, a plurality of teeth portions extending radially inward from the stator core, and a plurality of teeth shoes extending from the plurality of teeth portions in a circumferential direction.

The housing may include a flange portion extending radially, a coupling portion formed in a central area of the flange portion, a bearing hole formed in a central area of the coupling portion, a plurality of extensions extending downward from a radially outer area of the flange portion, and the stator groove formed in a lower area of each of the plurality of extensions.

The impeller cover may be bolted to an upper surface of the flange portion of the housing, and an inner peripheral surface of the impeller cover may be in contact with an outer peripheral surface of the coupling portion.

The housing may include a bearing protrusion extending radially inward from a lower end of the coupling portion, and a lower end of the bearing may be supported by the bearing protrusion.

An inner surface of each of the plurality of extensions may include a curved portion of which a radial radius increases as the inner surface of each of the plurality of extensions goes downward.

The coil may not radially overlap the curved portion.

The inner surface of each of the plurality of extensions may include a straight portion extending downward from the curved portion, and the magnet may radially overlap the straight portion.

A straight line extending an inner surface of a lower end of each of the plurality of extensions in a vertical direction may be disposed between a depressed surface of the stator groove and the straight portion.

A height of the coupling portion may be greater than a height of the flange portion.

The stator may include a housing groove that is concavely formed inward from an outer peripheral surface of the stator, and the plurality of extensions may be press-fitted into the housing groove.

A depressed surface of the housing groove may be in contact with a depressed surface of the stator groove.

The housing groove may extend in a vertical direction and penetrates an upper surface and a lower surface of the stator, and both side surfaces of each of the plurality of extensions may be press-fitted into the housing groove.

A radial depth of the housing groove may be less than a radial width of the lower area of each of the plurality of extensions where the stator groove is formed.

The housing groove may include a depressed surface that is recessed radially inward from the outer peripheral surface of the stator, and side surfaces that extend from each of circumferential direction ends of the depressed surface to the outer peripheral surface of the stator and are in contact with both side surfaces of each of the plurality of extensions. The depressed surface of the housing groove may extend from an upper surface to a lower surface of the stator.

The lower area of each of the plurality of extensions where the stator groove is formed may be formed in a 'ㄷ'-shape.

An outer surface of each of the plurality of extensions may include a first area that is disposed radially outward as the outer surface of each of the plurality of extensions goes downward, a second area extending downward from the first area, and a third area that is disposed radially inward as the outer surface goes downward from the second area.

In this case, the stator may radially overlap the second and third areas and may not radially overlap the first area.

The plurality of extensions may be arranged to be spaced apart at constant intervals in a circumferential direction of the flange portion.

The stator groove may include a depressed surface that is recessed radially outward from an inner surface of each of the plurality of extensions, an upper contact surface that extends from an upper end of the depressed surface to the inner surface of each of the plurality of extensions and is in contact with an upper surface of the stator, and a lower contact surface that extends from a lower end of the depressed surface to the inner surface of each of the plurality of extensions and is in contact with a lower surface of the stator.

A radial length of the lower contact surface of the stator groove may be less than a radial length of the upper contact surface.

The present disclosure can provide a motor that reduces the generation of vibration and noise by maintaining a constant air gap between a stator and a mover.

The present disclosure can also provide a motor that improves efficiency of the motor.

The present disclosure can also provide a motor that minimizes deformation and reduces the number of components by fixing a stator and a mover.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

It should be understood that when a component is described as being "connected to" or "coupled to" other component, it may be directly connected or coupled to the other component or intervening component(s) may be present.

It will be noted that a detailed description of known arts will be omitted if it is determined that the detailed description of the known arts can obscure embodiments of the present disclosure. The accompanying drawings are used to help easily understand various technical features and it should be understood that embodiments presented herein are not limited by the accompanying drawings. As such, the present disclosure should be understood to extend to any alterations, equivalents and substitutes in addition to those which are particularly set out in the accompanying drawings.

In addition, a term of "disclosure" may be replaced by terms such as document, specification, description, etc.

Figure 1:
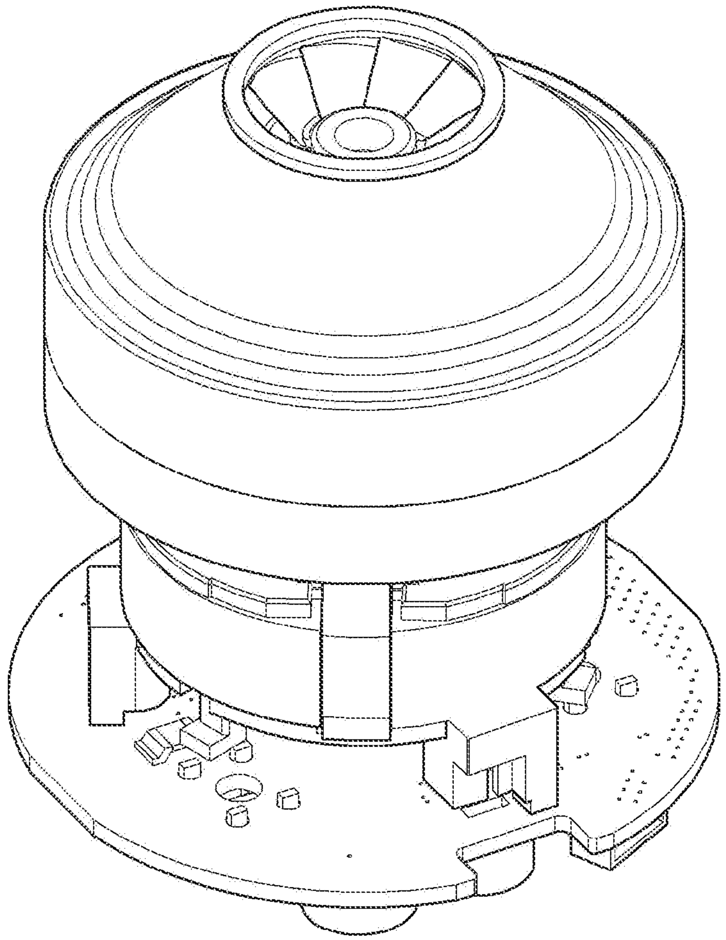
FIG. 1 is a perspective view of a motor according to an embodiment of the present disclosure.
Figure 2:
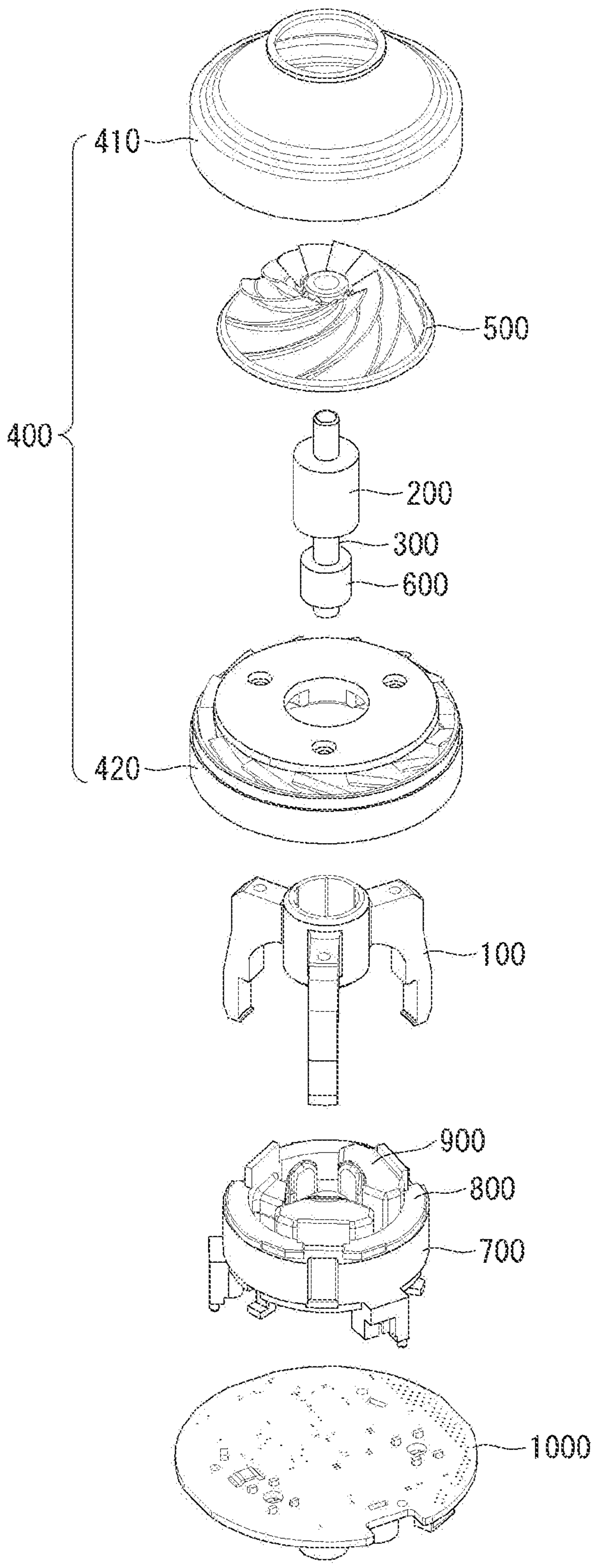
FIG. 2 is an exploded perspective view of a motor according to an embodiment of the present disclosure.
Figure 3:
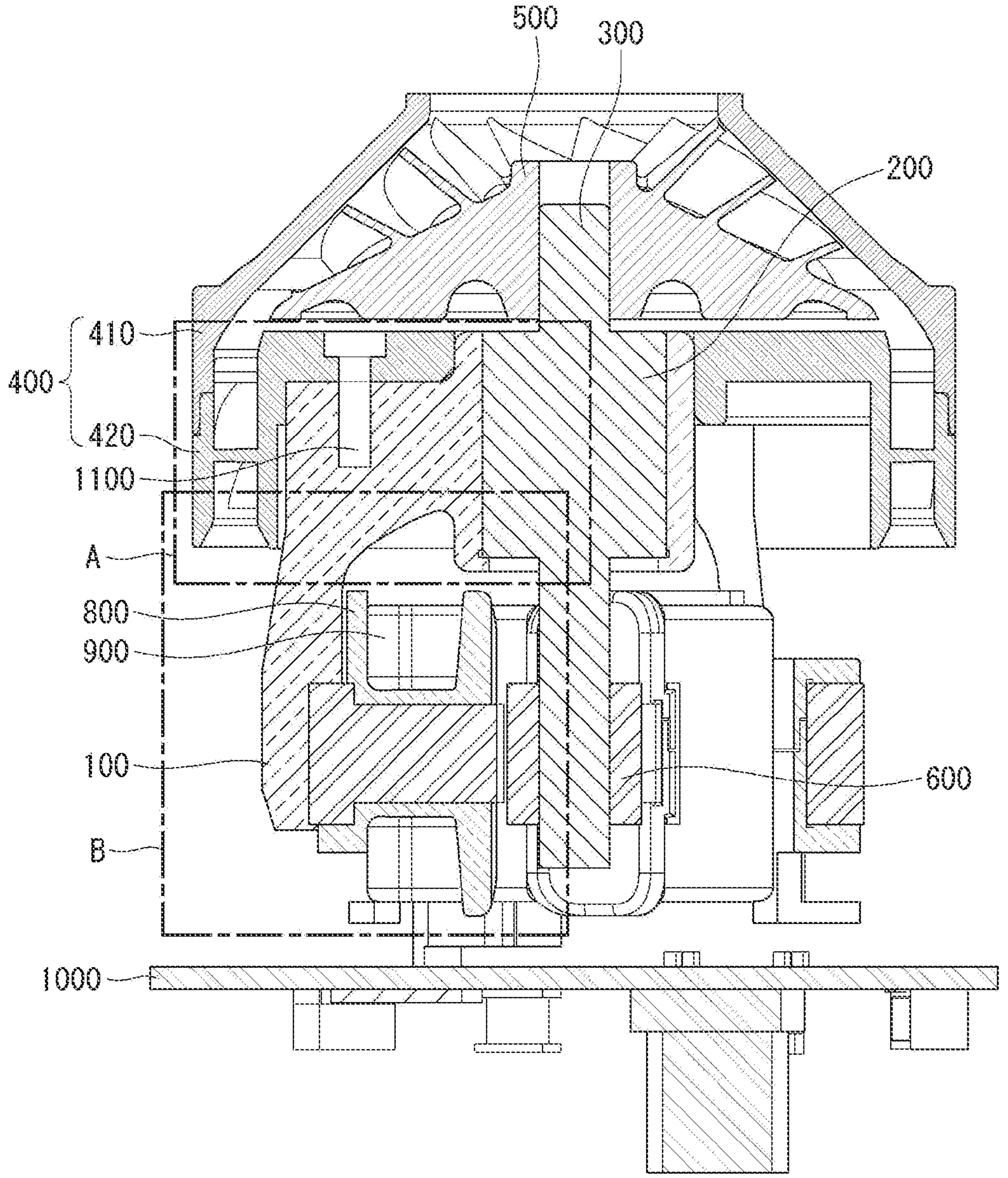
FIG. 3 is a cross-sectional view of a motor according to an embodiment of the present disclosure.
Figure 4:
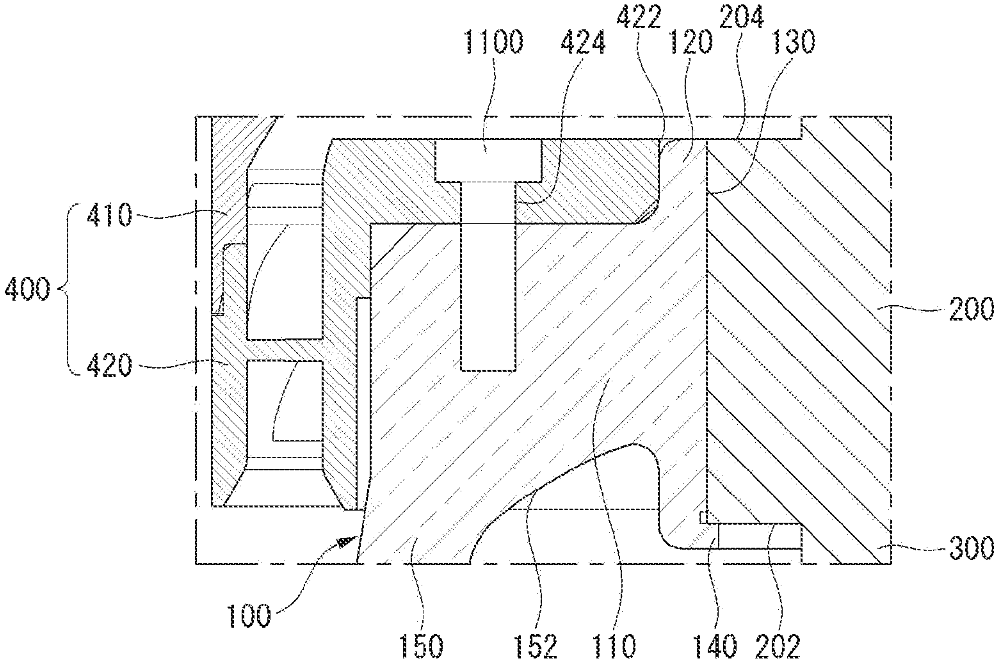
FIG. 4 is an enlarged view of a portion A of FIG. 3.
Figure 5:
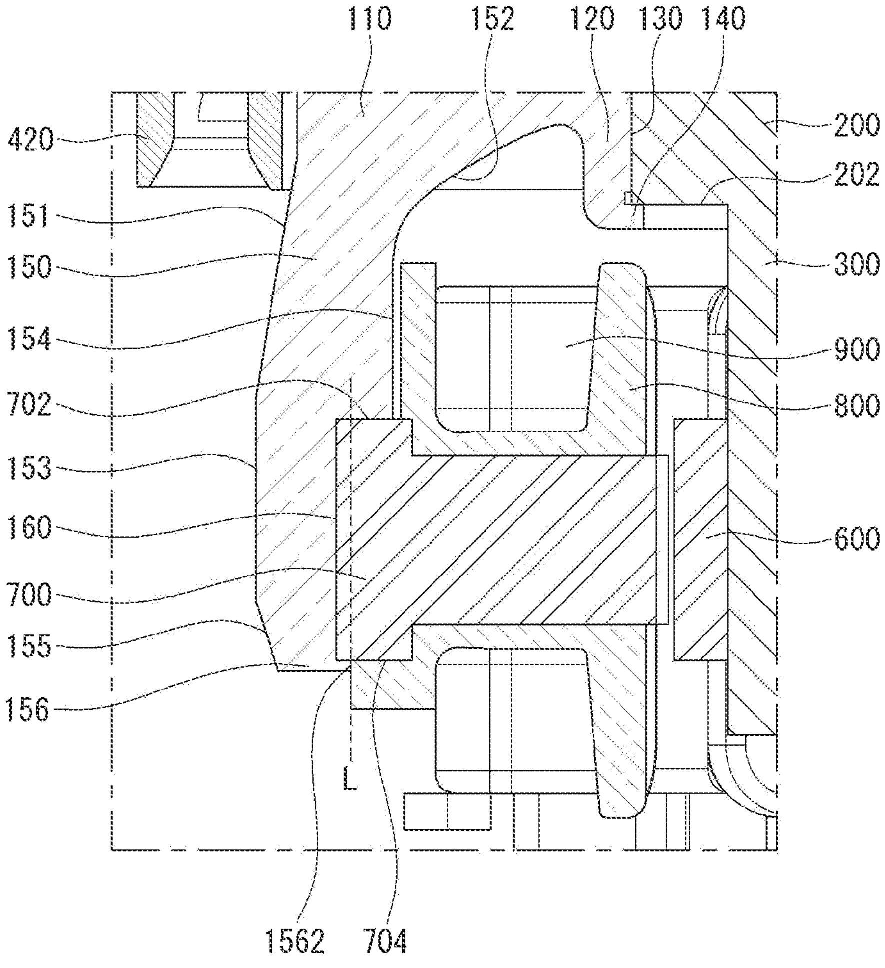
FIG. 5 is an enlarged view of a portion B of FIG. 3.
Figure 6:
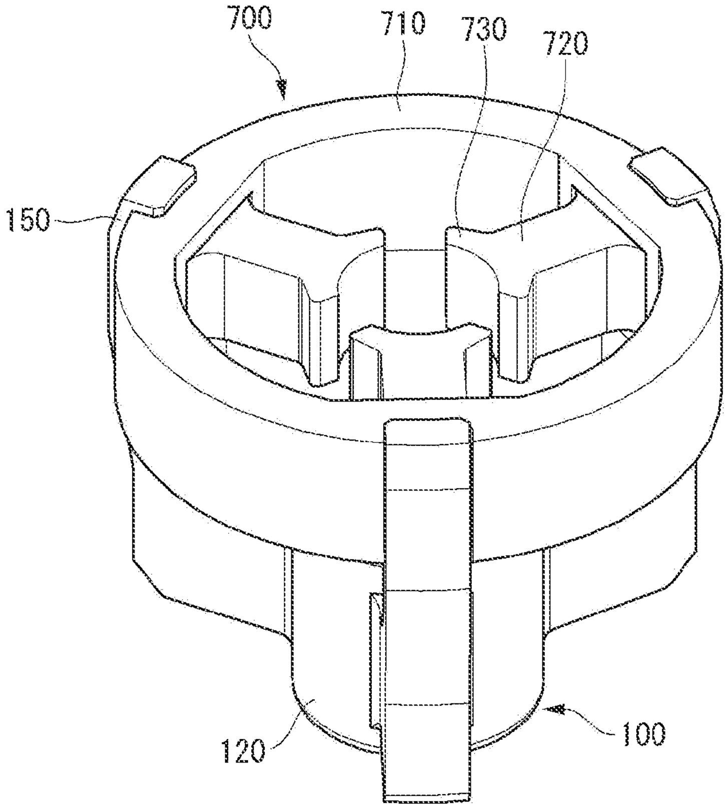
FIG. 6 is a perspective view of a housing and a stator of a motor according to an embodiment of the present disclosure.
Figure 7:
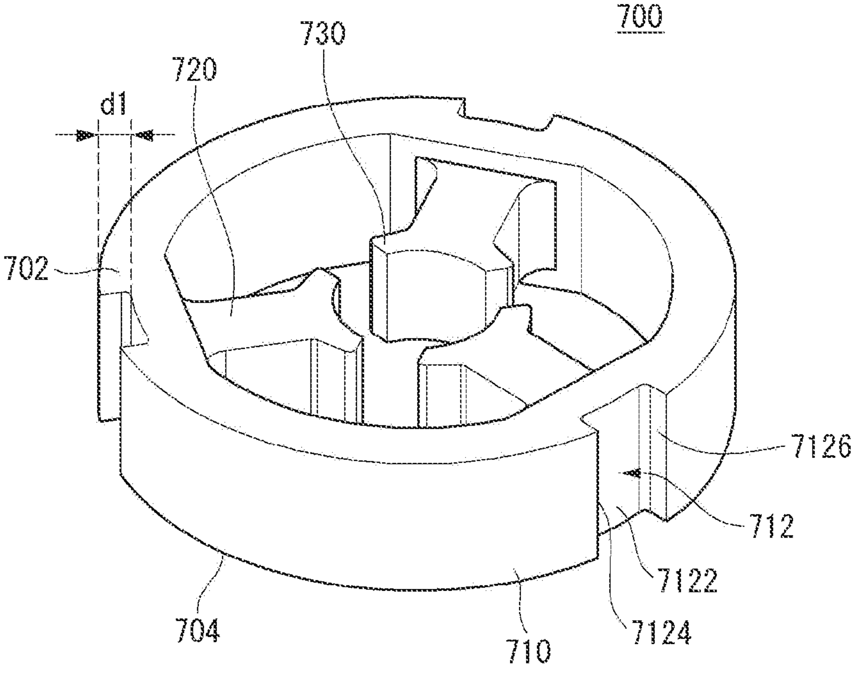
FIG. 7 is a perspective view of a stator of a motor according to an embodiment of the present disclosure.
Figure 8:
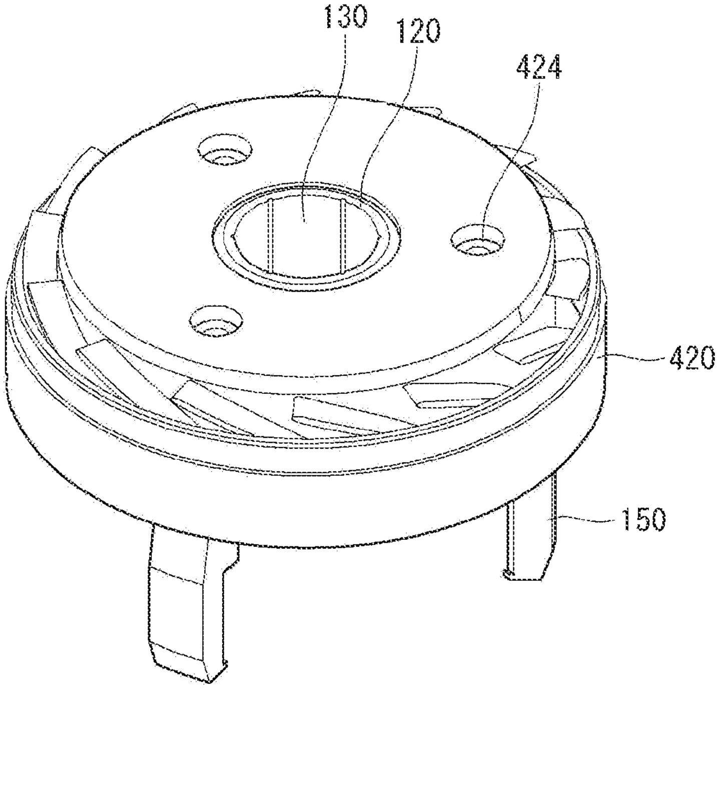
FIGS. 8 and 9 are perspective views of a partial configuration of an impeller cover and a housing according to an embodiment of the present disclosure.
Figure 9:
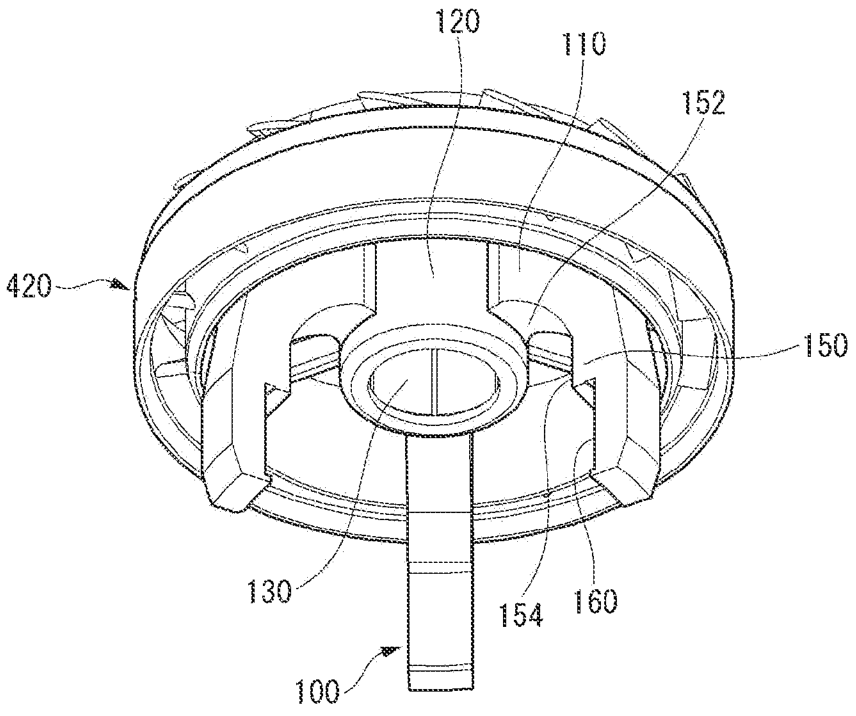
Figure 10:
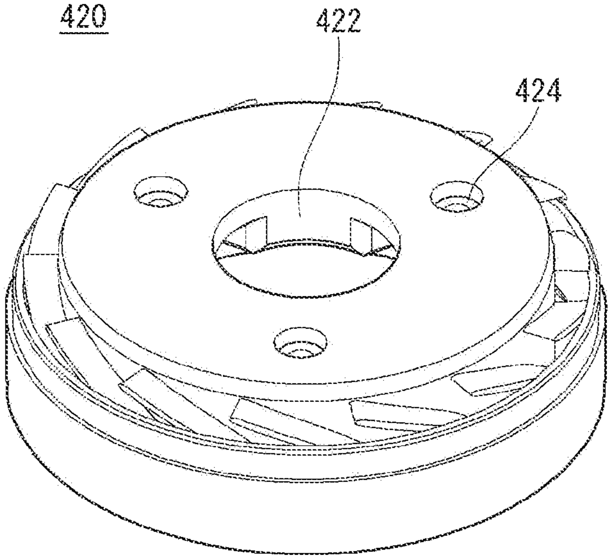
FIG. 10 is a perspective view of a partial configuration of an impeller cover according to an embodiment of the present disclosure.
Figure 11:
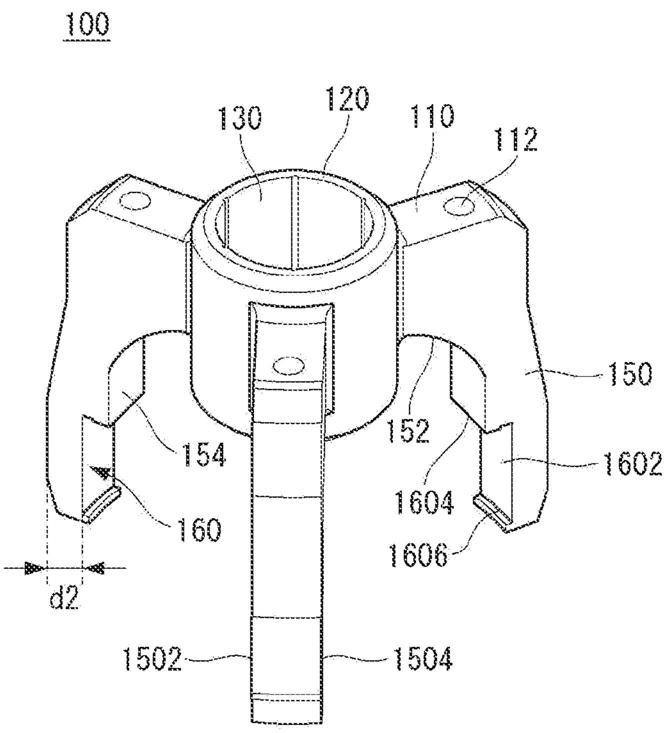
FIGS. 11 and 12 are perspective views of a housing according to an embodiment of the present disclosure.
Figure 12:
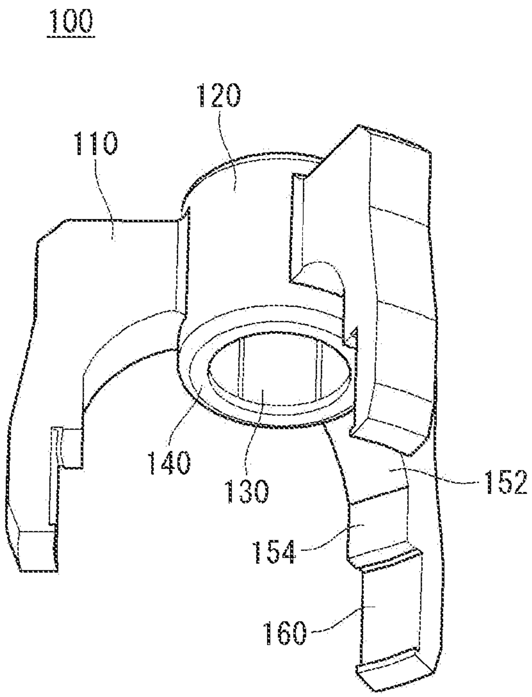

FIG. 1 is a perspective view of a motor according to an embodiment of the present disclosure. FIG. 2 is an exploded perspective view of a motor according to an embodiment of the present disclosure. FIG. 3 is a cross-sectional view of a motor according to an embodiment of the present disclosure. FIG. 4 is an enlarged view of a portion A of FIG. 3. FIG. 5 is an enlarged view of a portion B of FIG. 3. FIG. 6 is a perspective view of a housing and a stator of a motor according to an embodiment of the present disclosure. FIG. 7 is a perspective view of a stator of a motor according to an embodiment of the present disclosure. FIGS. 8 and 9 are perspective views of a partial configuration of an impeller cover and a housing according to an embodiment of the present disclosure. FIG. 10 is a perspective view of a partial configuration of an impeller cover according to an embodiment of the present disclosure. FIGS. 11 and 12 are perspective views of a housing according to an embodiment of the present disclosure.

Referring to FIGS. 1 to 12, a motor 10 according to an embodiment of the present disclosure may include a housing 100, a bearing 200, a rotating shaft 300, an impeller cover 400, an impeller 500, a magnet 600, a stator 700, an insulator 800, a coil 900, a controller 1000, and a coupling member 1100. However, the motor 10 can be implemented except for some of these components and does not exclude additional components.

The motor 10 according to an embodiment of the present disclosure is described using a motor used in a vacuum cleaner as an example, but is not limited thereto and can be applied to various devices.

In an embodiment of the present disclosure, an axial direction (or axially) can be understood to indicate a vertical direction based on FIG. 3, and a radial direction (or radially) can be understood to indicate a horizontal direction based on FIG. 3.

The housing 100 may be coupled to the impeller cover 400. An upper surface of the housing 100 may be coupled to a second impeller cover 420 of the impeller cover 400. The housing 100 may be disposed inside the second impeller cover 420. The stator 700 may be coupled to the housing 100. The stator 700 may be coupled to an inner side of the housing 100. The bearing 200 may be coupled to the housing 100. The bearing 200 may be coupled to the inner side of the housing 100. The housing 100 may be axially spaced apart from the impeller 500. The bearing 200, the rotating shaft 300, the magnet 600, the stator 700, the insulator 800, and the coil 900 may be disposed inside the housing 100.

The housing 100 may include a flange portion 110, a coupling portion 120, a bearing hole 130, a bearing protrusion 140, a plurality of extensions 150, and a stator groove 160.

The flange portion 110 may extend radially. An upper surface of the flange portion 110 may be coupled to the impeller cover 400. The upper surface of the flange portion 110 may be bolted to a lower surface of the second impeller cover 420. A fastening groove 112 may be formed on the upper surface of the flange portion 110 to be bolted to the lower surface of the second impeller cover 420. The fastening groove 112 of the flange portion 110 may axially overlap a fastening hole 424 of the second impeller cover 420. At least a portion of a radially outer surface of the flange portion 110 may be in contact with an inner surface of the impeller cover 400. At least a portion of the radially outer surface of the flange portion 110 may be in contact with an inner surface of the second impeller cover 420. The coupling portion 120 may be formed inside the flange portion 110.

The coupling portion 120 may be formed in a central area of the flange portion 110. The coupling portion 120 may extend axially upward or downward from a radially inner area of the flange portion 110. The coupling portion 120 may be formed in a cylindrical shape. The bearing 200 may be coupled to the coupling portion 120. An axial length or height of the coupling portion 120 may be greater than an axial length or height of the flange portion 110. Through this, the coupling portion 120 can stably support the bearing 200. An outer peripheral surface or outer surface of an upper end of the coupling portion 120 may be in contact with the impeller cover 400. An outer peripheral surface or outer surface of an upper area of the coupling portion 120 may be in contact with an inner surface or inner peripheral surface 422 of the second impeller cover 420. Through this, a coupling position of the impeller cover 400 with respect to the housing 100 can be guided.

The bearing hole 130 may be formed in a central area of the coupling portion 120. The bearing hole 130 may extend axially. The bearing 200 may be disposed in the bearing hole 130. An axial length or height of the bearing hole 130 may correspond to an axial length or height of the bearing 200.

The bearing protrusion 140 may extend inward from the coupling portion 120. The bearing protrusion 140 may extend radially inward from a lower end of the coupling portion 120. The bearing protrusion 140 may axially support a lower end 202 of the bearing 200. The magnet 600 may be axially supported through an electronic interaction with the stator 700 and/or the coil 900, and the axially lower end 202 of the bearing 200 coupled to the rotating shaft 300 coupled to the magnet 600 may be supported by the bearing protrusion 140. Hence, the bearing 200 can be prevented from being separated from the housing 100 or moving axially.

An embodiment of the present disclosure describes that the bearing protrusion 140 extends radially inward from the lower end of the coupling portion 120 so as to avoid interference with the impeller 500 and facilitate coupling between the components, by way of example. However, the bearing protrusion 140 may extend radially inward from the upper end and the lower end of the coupling portion 120 for structural stability and may axially support both an upper end 204 and the lower end 202 of the bearing 200.

The plurality of extensions 150 may extend downward from the flange portion 110. The plurality of extensions 150 may extend downward from a radially outer area of the flange portion 110. The stator 700 may be coupled to the plurality of extensions 150. The stator groove 160 to which the stator 700 is coupled may be formed in a lower area of each of the plurality of extensions 150. An outermost surface of each of the plurality of extensions 150 may be disposed more radially outward than the outer surface of the flange portion 110. Through this, space efficiency can be improved.

An embodiment of the present disclosure describes three extensions 150 by way of example, but is not limited thereto and can use two or extensions. In addition, the plurality of extensions 150 may be arranged to be spaced apart at constant intervals in a circumferential direction of the flange portion 110. Through this, structural stability can be improved.

An inner surface of each of the plurality of extensions 150 may include a curved portion 152. The curved portion 152 may be connected to the flange portion 110. A radial radius of the curved portion 152 may increase as the curved portion 152 goes downward. Through this, the space efficiency can be improved. The curved portion 152 may radially overlap the bearing 200. The curved portion 152 may not radially overlap the magnet 600, the stator 700, the insulator 800, and the coil 900. The curved portion 152 may radially overlap the lower area of the second impeller cover 420.

Each inner surface of the plurality of extensions 150 may include a straight portion 154. The straight portion 154 may extend axially downward from the curved portion 152. A radius of the straight portion 154 may be constant in the axial direction. The straight portion 154 may radially overlap the magnet 600, the stator 700, the insulator 800, and the coil 900. The stator groove 160 may be formed in the straight portion 154.

The stator groove 160 may be concavely formed radially outward from the inner surface of the housing 100. The stator groove 160 may be formed in the lower area of each of the plurality of extensions 150. The stator groove 160 may be formed in the straight portion 154. The stator 700 may be coupled to the stator groove 160. A stator core 710 of the stator 700 may be press-fitted into the stator groove 160.

The stator groove 160 may include a depressed surface 1602 that is recessed radially outward from the inner surface of each of the plurality of extensions 150, an upper contact surface 1604 that extends from an upper end of the depressed surface 1602 to the inner surface of each of the plurality of extensions 150 and is in contact with an upper surface 702 of the stator 700, and a lower contact surface 1606 that extends from a lower end of the depressed surface 1602 to the inner surface of each of the plurality of extensions 150 and is in contact with a lower surface 704 of the stator 700.

In this case, a radial length of the lower contact surface 1606 of the stator groove 160 may be less than a radial length of the upper contact surface 1604.

An outer peripheral surface of the stator 700 may be coupled to the depressed surface 1602 of the stator groove 160 by shrink fitting. When heat is applied to the plurality of extensions 150 of the housing 100 in a state in which the stator 700 and the housing 100 are separated from each other, the plurality of extensions 150 deform outwardly in the radial direction due to thermal expansion of the plurality of extensions 150. In this case, a housing groove 712 of the stator 700 passes through an inner surface 1562 of a lower end 156 of each of the plurality of extensions 150. Further, the inner surfaces of the plurality of extensions 150 must be sufficiently deformed to allow the housing groove 712 of the stator 700 to pass through the inner surface 1562 of the lower end 156 of the plurality of extensions 150. Therefore, it is preferable that the radial length of the lower contact surface 1606 of the stator groove 160 is less than the radial length of the upper contact surface 1604. Afterwards, when the heat cools down, the depressed surface 1602 of the stator groove 160 and a depressed surface 7122 of the housing groove 712 may be press-fitted to each other.

An axial length or height of the stator groove 160 may be less than an axial length or height of the stator 700. Through this, since the stator 700 can be press-fitted into the stator groove 160, the stator 700 can be fixed to the stator groove 160 without a separate configuration.

The plurality of extensions 150 may be coupled to the housing groove 712 of the stator 700. A circumferential length of the plurality of extensions 150 may be less than a circumferential length of the housing groove 712 of the stator 700. Through this, since the plurality of extensions 150 can be press-fitted into the housing groove 712 of the stator 700, the stator 700 can be fixed to the housing 100 without a separate configuration.

A straight line L extending the inner surface 1562 of the lower end 156 of the plurality of extensions 150 in the vertical direction may be disposed between the depressed surface 1602 of the stator groove 160 and the straight portion 154. The lower area of the plurality of extensions 150 where the stator groove 160 is formed may be formed in a 'ㄷ'-shape. Through this, the space efficiency can be improved.

An outer surface of each of the plurality of extensions 150 may include a first area 151 that is disposed radially outward as the outer surface goes downward, a second area 153 extending downward from the first area 151, and a third area 155 that is disposed radially inward as the outer surface goes downward from the second area 153. A vertical length of the second area 153 may be greater than a vertical length of the third area 155, and a vertical length of the first area 151 may be greater than the vertical length of the second area 153. In this case, the stator 170 may radially overlap the second and third areas 153 and 155 and may not radially overlap the first area 151. Through this, the space efficiency can be improved.

The present disclosure can reduce the generation of vibration and noise by maintaining a constant distance between the magnet 600, which is a mover, and the stator 700, which is a stator, through the shape of the housing 100, and thus can improve the efficiency of the motor 10. In addition, the present disclosure can minimize the deformation by fixing the stator 700 to the housing 100 without any additional configuration, and thus can reduce the number of components.

The bearing 200 may be disposed inside the housing 100. The bearing 200 may be coupled to the coupling portion 120 of the housing 100. The bearing 200 may be disposed in the bearing hole 130 of the housing 100. The lower end 202 of the bearing 200 may be axially supported by the bearing protrusion 140. The bearing 200 may be formed in a cylindrical shape. The rotating shaft 300 may be rotatably coupled to the bearing 200.

The rotating shaft 300 may be coupled to the bearing 200. The rotating shaft 300 may be rotatably coupled to the bearing 200. The rotating shaft 300 may extend axially. The magnet 600 may be coupled to the rotating shaft 300. The rotating shaft 300 may be coupled to the impeller 500. The rotating shaft 300 may rotate together with the magnet 600 to rotate the impeller 500 in one direction or another direction.

The impeller cover 400 may be disposed on the upper part of the housing 100. The impeller cover 400 may be coupled to the upper surface of the flange portion 110 of the housing 100. The impeller cover 100 may be bolted to the upper surface of the flange portion 110 of the housing 100 through the coupling member 1100. The impeller 500 may be disposed inside the impeller cover 400. The inner surface of the impeller cover 400 may be radially spaced apart from the impeller 500.

The impeller cover 400 may include a first impeller cover 410. The first impeller cover 410 may be coupled to the second impeller cover 420 through a stepped portion. A stepped portion of a lower end of the first impeller cover 410 may be engaged and coupled with a stepped portion of an upper end of a radially outer area of the second impeller cover 420. The impeller 500 may be disposed inside the first impeller cover 410. A blade of the impeller 500 may be disposed inside the first impeller cover 410. A radius of the first impeller cover 410 may decrease as it goes upward in the axial direction. The first impeller cover 410 may be formed in a cone shape with an open central area.

The impeller cover 400 may include the second impeller cover 420. The second impeller cover 420 may be coupled to the first impeller cover 410 through the stepped portion. The stepped portion of the upper end of the radially outer area of the second impeller cover 420 may be engaged and coupled with the stepped portion of the lower end of the first impeller cover 410. The second impeller cover 420 may be bolted to the upper surface of the flange portion 110 of the housing 100 through the coupling member 1100. The second impeller cover 420 may include a fastening hole 424 penetrated by the coupling member 1100. The inner peripheral surface 422 of the second impeller cover 420 may be in contact with the outer peripheral surface of the upper area of the coupling portion 120 of the housing 100. The second impeller cover 420 may be referred to as a guide vane or a diffuser assembly. The second impeller cover 420 may guide air suctioned through the first impeller cover 410 toward the controller 1000.

The impeller 500 may be disposed inside the impeller cover 400. The impeller 500 may be coupled to the rotating shaft 300. The impeller 500 may rotate in one direction or another direction inside the impeller cover 400 based on the rotation of the rotating shaft 300.

The magnet 600 may be coupled to the rotating shaft 300. The magnet 600 may be coupled to a lower area of the rotating shaft 300. The magnet 600 may face the stator 700 on which the coil 900 is wound. The magnet 600 may face a teeth shoe 730 of the stator 700. The magnet 600 may be formed in a cylindrical shape. The magnet 600 may radially overlap the plurality of extensions 150 of the housing 100. The magnet 600 may radially overlap the straight portion 154 of the housing 100. The magnet 600 may radially overlap the stator groove 160.

The stator 700 may be coupled to the housing 100. The stator 700 may be coupled to the plurality of extensions 150 of the housing 100. The stator 700 may be press-fitted into the stator groove 160 of the housing 100. The stator 700 may face the magnet 600. Through this, the present disclosure can reduce the generation of vibration and noise by maintaining a constant distance between the magnet 600, which is a mover, and the stator 700, which is a stator, and thus can improve the efficiency of the motor 10. In addition, the present disclosure can minimize the deformation by fixing the stator 700 to the housing 100 without any additional configuration, and thus can reduce the number of components.

The stator 700 may include the stator core 710. The stator core 710 may be formed in a cylindrical shape as a whole. The stator core 710 may be formed by axially stacking a plurality of core plates. The stator core 710 may be coupled to the housing 100. An axial length or height of the stator core 710 may be greater than the length or height of the stator groove 160. The stator core 710 may be press-fitted into the stator groove 160.

The stator core 710 may include the housing groove 712 formed on its outer peripheral surface. The housing groove 712 may extend inward from the outer peripheral surface of the stator core 710 and may extend axially. At least one extension 150 of the housing 100 may be press-fitted into the housing groove 712. The circumferential length of the housing groove 712 may be less than the circumferential length of the plurality of extensions 150. A depressed surface of the housing groove 712 may be in contact with the stator groove 160 formed in the plurality of extensions 150.

The housing groove 712 may include the depressed surface 7122 that is recessed radially inward from the outer peripheral surface of the stator 700, and side surfaces 7124 and 7126 that extend from each of circumferential direction ends of the depressed surface 7122 to the outer peripheral surface of the stator 700 and are in contact with both side surfaces 1502 and 1504 of each of the plurality of extensions 150. In this case, the depressed surface 7122 may extend from the upper surface 702 to the lower surface 704 of the stator 700.

The depressed surface 7122 of the housing groove 712 may be in contact with the depressed surface 1602 of the stator groove 160. The housing groove 712 may extend in the vertical direction and penetrate the upper surface 702 and the lower surface 704 of the stator 700. Both side surfaces 1502 and 1504 of the plurality of extensions 150 may be press-fitted into the housing groove 712. A radial depth d1 of the housing groove 712 may be less than a radial width d2 of the lower area of the plurality of extensions 150 where the stator groove 160 is formed. Through this, the present disclosure can provide a space where the lower ends 156 of the plurality of extensions 150 can support the lower surface 704 of the stator 700.

The stator 700 may include a plurality of teeth portions 720. The plurality of teeth portions 720 may extend radially inward from the stator core 710. The coil 900 may be wound around the plurality of teeth portions 720. An embodiment of the present disclosure describes that the insulator 800 is disposed on the plurality of teeth portions 720 and the coil 900 is wound around the insulator 800, by way of example. However, the coil 900 may be directly wound around the plurality of teeth portions 720 without the insulator 800.

The stator 700 may include a plurality of teeth shoes 730. The plurality of teeth shoes 730 may extend from the plurality of teeth portions 720 in the circumferential direction, respectively. The plurality of teeth shoes 730 may face the magnet 600.

An embodiment of the present disclosure describes that the three teeth portions 720 and the three teeth shoes 730 are used, by way of example, but is not limited thereto and can variously change the number of teeth portions 720 and the number of teeth shoes 730 based on the type and the size of the motor 10.

The insulator 800 may be coupled to the stator 700. The insulator 800 may include a plurality of insulator units respectively disposed on the plurality of teeth portions 720 of the stator 700. A plurality of coil units may be wound around the plurality of insulator units, respectively.

The coil 900 may be wound around the stator 700. The coil 900 may be wound around the insulator 800. The coil 900 may include the plurality of coil units respectively wound around the plurality of insulator units. Only a part of the plurality of coil units may radially overlap the stator groove 160. The coil 900 may not radially overlap the curved portion 152 of the housing 100. When power is supplied to the coil 900, an electric field may be formed in the stator 700, and the rotating shaft 300 may rotate in one direction or another direction by an electromagnetic interaction with the magnet 600. The coil 900 may be electrically connected to the controller 1000.

The controller 1000 may be disposed on the lower part of the housing 100. The controller 1000 may be electrically connected to the coil 900. The controller 1000 may include a printed circuit board (PCB), a plurality of elements disposed on the PCB, and a power supply unit connected to a power source. The controller 1000 may control power and/or current provided to the coil 900.

The coupling member 1100 may bolt the impeller cover 400 to the housing 100. The coupling member 1100 may pass through the fastening hole 424 of the second impeller cover 420 and may be inserted into the fastening groove 112 of the housing 100.

Figure 13:
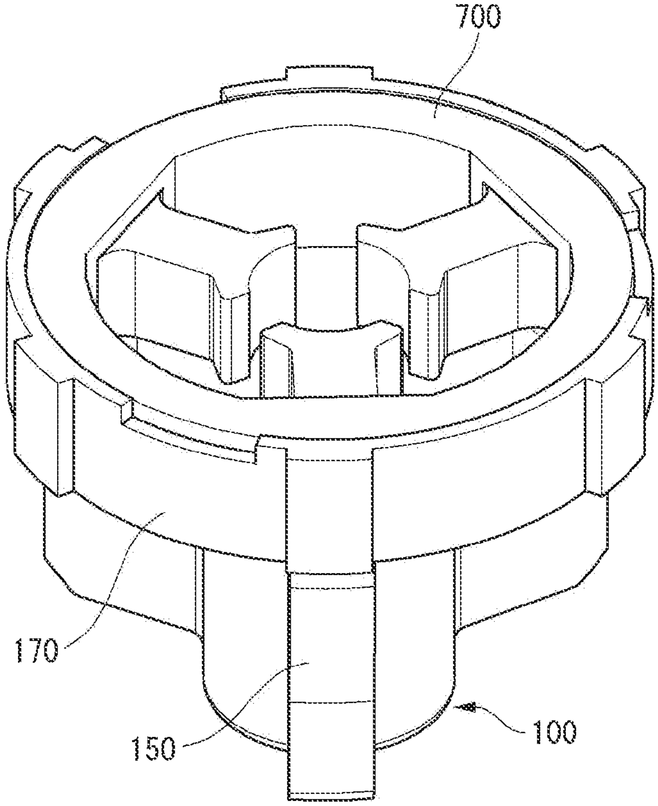
FIG. 13 is a perspective view of a housing and a stator according to another embodiment of the present disclosure.

FIG. 13 is a perspective view of a housing and a stator according to another embodiment of the present disclosure.

Referring to FIG. 13, a housing 100 according to another embodiment of the present disclosure may include a stator coupling portion 170 surrounding an outer peripheral surface of a stator 700. In this case, the stator coupling portion 170 may be formed in a lower area of each of a plurality of extensions 150. The outer peripheral surface of the stator 700 may be press-fitted to an inner peripheral surface of the stator coupling portion 170 through heat.

Some embodiments or other embodiments of the present disclosure described above are not exclusive or distinct from each other. Some embodiments or other embodiments of the present disclosure described above can be used together or combined in configuration or function.

For example, configuration “A” described in an embodiment and/or the drawings and configuration “B” described in another embodiment and/or the drawings can be combined with each other. That is, even if the combination between the configurations is not directly described, the combination is possible except in cases where it is described that it is impossible to combine.

The above detailed description is merely an example and is not to be considered as limiting the present disclosure. The scope of the present disclosure should be determined by rational interpretation of the appended claims, and all variations within the equivalent scope of the present disclosure are included in the scope of the present disclosure.

The invention claimed is:

1. A motor comprising:
- a housing that defines a stator groove, the stator groove being recessed radially outward from an inner surface of the housing;
- a bearing disposed in the housing;
- a rotating shaft rotatably coupled to the bearing;
- an impeller cover disposed at an upper part of the housing;
- an impeller disposed inside the impeller cover and coupled to the rotating shaft;
- a magnet coupled to a lower portion of the rotating shaft;
- a stator that is press-fitted into the stator groove of the housing and faces the magnet; and
- a coil wound around the stator,
- wherein the housing comprises:
  - a coupling portion disposed at a central area of the housing, the coupling portion defining a bearing hole at the central area,
  - a plurality of flange portions that extend radially outward from the coupling portion, and
  - a plurality of extensions that extend downward from radially outer portions of the plurality of flange portions, respectively,
- wherein the stator groove is defined at a lower area of each of the plurality of extensions,
- wherein the stator defines a plurality of housing grooves that are concavely recessed inward from an outer peripheral surface of the stator, and
- wherein the plurality of extensions are press-fitted into the plurality of housing grooves, respectively.

2. The motor of claim 1, wherein the stator comprises:
- a stator core that is press-fitted into the stator groove;
- a plurality of teeth portions that extend radially inward from an inner circumferential surface of the stator core; and
- a plurality of teeth shoes that extend from the plurality of teeth portions in a circumferential direction, respectively.

3. The motor of claim 1, wherein the impeller cover is bolted to upper surfaces of the plurality of flange portions, and
- wherein an inner peripheral surface of the impeller cover is in contact with an outer peripheral surface of the coupling portion.

4. The motor of claim 1, wherein the housing further comprises a bearing protrusion that extends radially inward from a lower end of the coupling portion and supports a lower end of the bearing.

5. The motor of claim 1, wherein a height of the coupling portion in an axial direction of the rotating shaft is greater than a height of each of the plurality of flange portions in the axial direction.

6. The motor of claim 1, wherein a depressed surface of each of the plurality of housing grooves is radially in contact with a depressed surface of the stator groove.

7. The motor of claim 1, wherein each of the plurality of housing grooves extends in a vertical direction and passes through an upper surface of the stator and a lower surface of the stator, and
- wherein upper and lower surfaces of each of the plurality of extensions are press-fitted into one of the plurality of housing grooves.

8. The motor of claim 1, wherein a radial depth of each of the plurality of housing grooves is less than a radial thickness of the lower area of each of the plurality of extensions that defines the stator groove.

9. The motor of claim 1, wherein each of the plurality of housing grooves comprises:
- a depressed surface that is recessed radially inward from the outer peripheral surface of the stator, the depressed surface extending from an upper surface of the stator to a lower surface of the stator; and
- side surfaces that extend from circumferential ends of the depressed surface to the outer peripheral surface of the stator, respectively, the side surfaces of each of the plurality of housing grooves being in contact with side surfaces of each of the plurality of extensions.

10. The motor of claim 1, wherein the lower area of each of the plurality of extensions with the stator groove has a rotated U-shape.

11. The motor of claim 1, wherein the plurality of extensions are spaced apart from one another by a constant interval in a circumferential direction of the plurality of flange portions.

12. The motor of claim 1, wherein an outer surface of each of the plurality of extensions comprises:
- a first area that extends radially outward as each of the plurality of extensions extends downward;
- a second area that extends downward from the first area; and
- a third area that extends radially inward as each of the plurality of extensions extends downward from the second area.

13. The motor of claim 12, wherein the stator radially faces the second and third areas and does not radially face the first area.

14. The motor of claim 1, wherein the stator groove comprises:
- a depressed surface that is recessed radially outward from an inner surface of each of the plurality of extensions;
- an upper contact surface that extends from an upper end of the depressed surface to the inner surface of each of the plurality of extensions, the upper contact surface being in contact with an upper surface of the stator; and
- a lower contact surface that extends from a lower end of the depressed surface to the inner surface of each of the plurality of extensions, the lower contact surface being in contact with a lower surface of the stator.

15. The motor of claim 14, wherein a radial length of the lower contact surface of the stator groove is less than a radial length of the upper contact surface.

16. The motor of claim 1, wherein an inner surface of each of the plurality of extensions comprises a curved portion that is curved radially outward such that a radius of the curved portion from the rotating shaft increases as each of the plurality of extensions extends downward.

17. The motor of claim 16, wherein the coil is spaced apart from the curved portion.

18. The motor of claim 16, wherein the inner surface of each of the plurality of extensions further comprises a straight portion that extends downward from the curved portion and that radially faces the magnet.

19. The motor of claim 18, wherein the stator extends radially outward relative to the straight portion such that a straight line passing through a lower end of each of the plurality of extensions in a vertical direction is disposed radially between a depressed surface of the stator groove and the straight portion.

* * * * *